US007734498B2

(12) United States Patent
Chen-Ritzo et al.

(10) Patent No.: US 7,734,498 B2
(45) Date of Patent: Jun. 8, 2010

(54) METHOD AND SYSTEM FOR MINIMIZING RISK IN CONTACT CENTER MANAGEMENT CONTRACTS

(75) Inventors: Ching-Hua Chen-Ritzo, Mahopac, NY (US); Daniel Connors, Pleasant Valley, NY (US); Laura Wynter, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 11/624,312

(22) Filed: Jan. 18, 2007

(65) Prior Publication Data

US 2008/0177615 A1    Jul. 24, 2008

(51) Int. Cl.
*G06F 17/30* (2006.01)
(52) U.S. Cl. ............... 705/10; 705/7; 705/8; 705/9
(58) Field of Classification Search ........ 705/7–10, 705/1
See application file for complete search history.

(56) References Cited

U.S. PATENT DOCUMENTS

2004/0225549 A1* 11/2004 Parker et al. ............... 705/8
2005/0065837 A1  3/2005 Kosiba et al.
2005/0288984 A1* 12/2005 Hamilton .................. 705/8
2006/0080156 A1*  4/2006 Baughn et al. ............ 705/7
2007/0067204 A1*  3/2007 Brown et al. ............. 705/10

OTHER PUBLICATIONS

Usher, Frank. "IT Outsourcing and Pricing: How Much, How Long, and What to Price". Everest Group. <http://www.outsourcing-best-practices.com/pricing.html>; Publication date: May 2006 (3 pages).*
Short, Greg. "Don't Skip on the Details Structuring and Documenting the Real Content of Outsourcing Agreements" Outsourcing Center. <http://www.outsourcing-best-practices.com/details.html.>; Published Apr. 2002 (7 pages).*
Young, Dorothy G. "Study Reveals the Financial Impact of Outsourcing". Telemarketing & Call Center Solutions. Mar. 1998 (4 pages).*
Frei, Mark. "Developing a Successful Call Center Outsourcing Plan". Telemarketing and Call Center Solutions. Nov. 1997 (3 pages).*
Wang, Kung-Jeng, H.M. Wee, Jonas Yu, and K.Y. Kung. "Coordinated Resource Allocation by Mutual Outsourcing in Decentralized Supply Chain", SEAL 2006, LNCS 4247, pp. 766-733, 2006; Springer-Verlag Berlin Heidelberg 2006 (8 pages).*

* cited by examiner

*Primary Examiner*—James P Trammell
*Assistant Examiner*—Elda Milef
(74) *Attorney, Agent, or Firm*—McGinn IP Law Group, PLLC

(57) ABSTRACT

A method (and system) for contact center management contract evaluation including determining a potential profitability/risk for contact center management based upon a proposed contract term between one of a client and a service provider, and a service provider and a vendor.

1 Claim, 5 Drawing Sheets

METHOD AND SYSTEM FOR MINIMIZING RISK IN CONTACT CENTER MANAGEMENT CONTRACTS

BACKGROUND OF THE INVENTION

1. Field of the Invention

The present invention generally relates to a method and system for minimizing risk in contact center management contracts. More particularly, the present invention provides a method and system for determining the risk exposure of potential contract terms and conditions and providing decision support for improving the contract terms and conditions.

2. Description of the Related Art

FIG. 1 illustrates a contact center environment 100. The environment 100 includes one or more clients 102 that has a need for handling contacts. A client 102 may engage one or more service providers 104 and negotiate a contract with each of the service providers 104 to arrange to handle contacts for the client 102. In turn, the service provider 104 may outsource the handling of the contacts to one or a plurality of vendors 106. The service provider 104 may enter into a contract with each of the vendors to handle contacts on behalf of the service provider 104 for the client 102. Each vendor 106 may include one or more call centers 108 that actually handle the contacts.

In this environment, multiple service contracts may exist between the various parties involved. Before a contract is signed, it is valuable to know what contract terms are likely to lead to a profitable outcome. Management of contact centers is fairly complicated and it can be difficult to determine how to structure and parameterize contract terms to optimize the likelihood of a profitable outcome.

Contracts for information technology outsourcing, business transformation outsourcing, and contact center hosting/management are typically specified well in advance of the actual commencement of the outsourced service(s).

An outsourcing contract may be executed between a client and a service provider and/or between a service provider and a vendor. Contracts between a client and service provider may include conditions that involve the vendors used by the service provider. A client may outsource its services to one or more service providers, and may be interested in optimizing its business objectives across all outsourcing engagements. Similarly, a service provider may support one or more clients and may use one or more vendors, and may be interested in optimizing its business objectives across all such engagements.

The client and service provider involved in an outsourcing engagement may have an incentive to minimize risk when devising the contracts. In contact center contracts, risk may be associated with one or more factors, including, for example, the costs incurred by the involved parties, revenue earned by the involved parties, and/or quality of service provided to the client(s).

Assessing risk is very complicated for the service provider due to the principal features of these types of outsourcing contracts.

Contracted prices may be paid by the service provider to the third-party vendors and contracted prices are paid to the service provider by the client. However, the contracted prices may vary depending upon the volume of contacts handled in various time periods (e.g., billing cycles) over the life of the contract. These volumes may not be known precisely at the time that the contract is written. Further, contract price structures are often complex (e.g., non-linear and discontinuous functions due to volume discounts, step-wise costs, dependencies on occupancy levels, etc.), making it computationally challenging to estimate the service provider's cost and revenue over the life of the contract.

Multiple financial penalty and bonus structures relating to the quality of service(s) provided may also be specified in an outsourcing contract. The realized quality of service may depend upon the delivery of the service over the course of the contract.

Multiple constraints may be imposed in such contracts, such as the minimum amount of load to each vendor and/or the minimum occupancy level at each site or vendor. These contracted constraints may limit the ability of the client(s), service provider(s) and/or vendor(s) to optimize their business objectives (e.g., minimize cost, maximize revenue, and maximize profit).

Given the complex price structures, penalty and bonus structures and operating constraints specified in an outsourcing contract, it is challenging for any of the parties involved to estimate potential financial gains and exposure to the risk of financial losses over the life of the outsourcing contract(s). This assessment is important during the contract negotiation phase, so that the parties involved more intelligently (i.e., in a manner that promotes their business objectives) negotiate the terms and conditions of the contract(s).

One conventional method collects and stores data in a database of a computer system regarding a contractual agreement. This method establishes a plurality of data fields in a database corresponding to a selected contract term or contract condition identifies a clause in the contractual agreement corresponding to the selected contract term or contract condition and compares the identified clause to a standard contract clause corresponding to the selected contract term or contract condition.

Another conventional method produces quotations and related information on optimized inputs and services for the production of food, feed, fiber, livestock, and the like, and executes customized commercial service agreements including a performance guaranty or insurance policy. This system includes a database of historical input and service performance and a decision support system to optimize future performance. The commercial service agreement includes protocols for applying inputs, performing services, and assessing performance. Related information includes input management plans; savings, rebate or cost-share information, applications or credits; information or forms for permits or regulatory compliance; and emissions trading credits or executed trades. The system administers a remedy if performance standards are not met. This method has broad application to plant and livestock production in reducing nutrient and pesticide inputs and pollution, and in reducing economic risks for producers and input/service providers.

Another conventional method predicts the expected performance of a contact center. The method includes receiving performance information from a performance monitoring system associated with the processing center system. The method generates predictions based on a computer model and analyzes the predictions to generate performance scenarios for the contact center.

SUMMARY OF THE INVENTION

In view of the foregoing and other exemplary problems, drawbacks, and disadvantages of the conventional methods and structures, an exemplary embodiment of the present invention provides a method and structure for assessing the risk associated with contact center outsourcing contracts which specify complex pricing, penalty/bonus structures and operating constraints for the purpose of identifying favorable parameters for such terms and conditions, from the perspective of the client or service provider.

None of the above conventional methods and systems is capable of evaluating multiple alternative contract terms to determine which contract term provides the highest likelihood for profitability or, alternatively, the least exposure to the risk of financial loss. In particular, they do not provide a method for performing this evaluation for the complex pricing and penalty/bonus structures and operating constraints that may be included in the terms and conditions of an outsourcing contract.

Additionally, conventional methods are not designed for the contact center management outsourcing environment addressed by this invention (i.e., one in which there are clients, service providers and vendors, with the specified relationships between the parties).

In a first exemplary aspect of the present invention, a method for contact center management contract evaluation includes determining a potential profitability/risk for contact center management based upon a proposed contract term between one of a client and a service provider and a service provider and a vendor.

In a second exemplary aspect of the present invention, a system for contact center management contract evaluation includes a potential profitability/risk determiner that determines a potential profitability/risk for contact center management based upon a proposed contract term between one of a client and a service provider and a service provider and a vendor.

In a third exemplary aspect of the present invention, a system for contact center management contract evaluation includes means for determining a first potential profitability/risk for contact center management based upon a proposed contract term between one of a client and a service provider and a service provider and a vendor.

This invention provides a method for performing this assessment in the outsourcing environment for contact center management that was described earlier. It can be utilized by a client, a service provider and/or a vendor for this purpose.

An exemplary embodiment of the present invention receives a range and/or alternative set of terms, simulates the effects of each of those alternative terms, and provides a potential profitability for each of the alternative set of terms. In stark contrast, conventional methods and systems merely simulate potential profitability for a single instance of contract terms.

An exemplary embodiment of the present invention receives a plurality of alternative contract terms and evaluates the potential profitability for each of these terms. The system may also explore a space of possible contract terms and evaluate each of them.

An exemplary embodiment of the present invention may identify a good set of contract terms from a plurality of contract terms which provides a high potential profitability for the service provider. This good set of contract terms may include a specification of the parameters for a complex pricing structure, including a structure which may be multi-dimensional (e.g., the price paid to vendors by the service provider may depend on both call volume and vendor occupancy level), non-linear and/or discontinuous (e.g., step functions in which the price paid to the service provider by the client may vary by call volume having given thresholds). It may also include a specification of the parameters for a penalty or bonus contract condition. For example, the present invention may specify service level targets and bonus/penalty rates that will ensure the profitability of the service provider.

An exemplary embodiment of the present invention may evaluate the profitability of each of a plurality of alternative terms as applied within another set of contracts. For example, the invention may evaluate the likely profitability of a plurality of alternative contract terms between a client and a service provider within the context of that service provider's existing contracts between vendors and that service provider.

An exemplary embodiment of the present invention may receive a range of values for alternative contract terms and provide a likely profitability across each of the range of values. For example, a customer may provide information regarding a range of potential call volumes that may be expected to be received and may also provide a proposed contract with proposed terms. For example, the present invention may output the potential profitability across the range of call volumes including, for example, the potential profitability at each end of a range of call volumes.

An exemplary embodiment of the present invention may receive a proposed contract having terms and provide the user with the opportunity to adjust the contract terms to determine the effect of such adjustments upon potential profitability. In this manner, an existing proposed contract may be evaluated and compared with alternative terms, to thereby suggest potential areas of term negotiation which may provide the most significant affect upon potential profitability.

An exemplary embodiment of the present invention may receive multiple different contract terms and provide suggestions as to which of those contract terms a user should focus upon during negotiations. For example, an exemplary embodiment of the present invention may provide a sensitivity analysis whereby each of the different contract terms is evaluated for the sensitivity of the affect of a change to that contract term to the potential profitability. A contract term to which the potential profitability is identified as having a high sensitivity to, may be a contract term upon which the user/negotiator focuses upon improving and, thus, to thereby improve potential profitability.

An exemplary embodiment of the present invention may suggest a threshold value for a contract term beyond which a significant adverse and/or positive effect upon profitability may be achieved. For example, if a service provider has a contract with a client that specifies a targeted average handling time that needs to be achieved by the service provider in order to avoid paying the client a penalty, the embodiment may be used to advise the service provider regarding the threshold above which it is no longer of practical value to negotiate a higher average handling time target or a lower penalty cost. At the same time, an exemplary embodiment of the present invention may also be used to advise the service provider regarding the threshold below which it is overly risky to set the average handling time target, because it is unlikely that the service provider will be able to meet such a target, and may, therefore, limit its profitability even if the penalty cost is relatively low. In fact, an exemplary embodiment of the present invention may identify one or more combinations of penalty costs and average handling time targets that are favorable to the service provider. In particular, an exemplary embodiment of the present invention may conduct a series of analyses of proposed alternative contract terms to determine such threshold values for one or more contract parameters. Additionally, these analyses may be performed for the benefit of either the client or the service provider.

An exemplary embodiment of the present invention may provide a user with an interface which allows a user to input different contract terms. For example, the interface may allow adjustment of metrics, thresholds, and the like.

An exemplary embodiment of the present invention may also provide a confidence indicator that provides an indication of how likely a proposed set of terms is expected to achieve a given level of profitability.

An exemplary embodiment of the present invention provides a framework for assessing and evaluating risk of a business outsourcing or contact center service contract and/or for proposing improved terms and conditions so as to mitigate contract risk for the service provider.

These and many other advantages may be achieved with the present invention.

BRIEF DESCRIPTION OF THE DRAWINGS

The foregoing and other exemplary purposes, aspects and advantages will be better understood from the following detailed description of an exemplary embodiment of the invention with reference to the drawings, in which.

Figure 1:
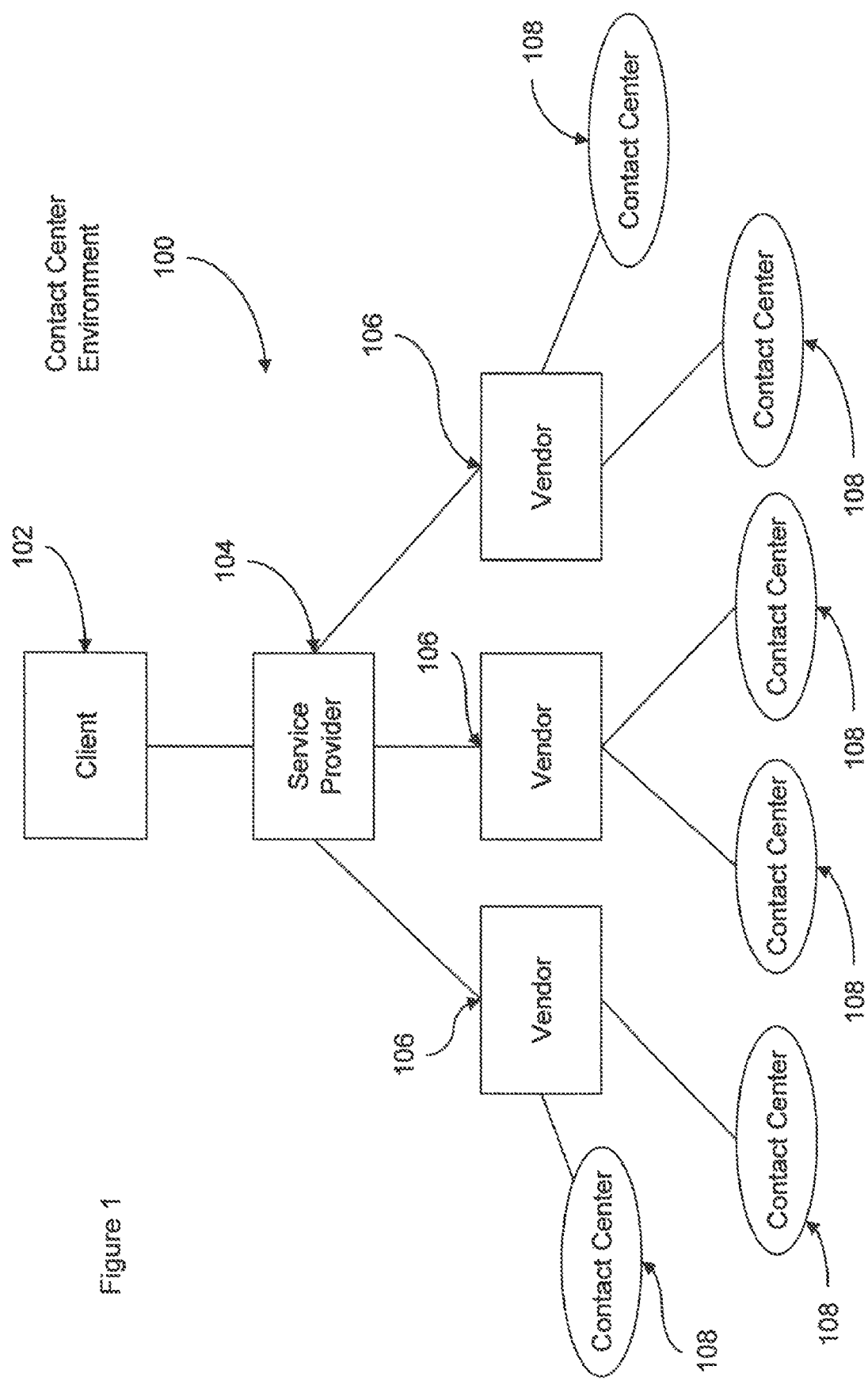
FIG. 1 illustrates an exemplary contact center management environment 100 in accordance with the present invention.

DETAILED DESCRIPTION OF EXEMPLARY
EMBODIMENTS OF THE INVENTION

Referring now to the drawings, and more particularly to FIGS. 2-5, there are shown exemplary embodiments of the method and structures of the present invention.

The present invention may assist in the negotiation and establishment of a business outsourcing contract, such as, for example, a contract for hosting a set of vendor-run contact centers for a client. The particularity of this exemplary context is that a contract exists between the client and the service provider on the one hand and between the service provider and the vendors who carry out the service on the other hand. Because the service provided is logged electronically, it is possible to perform effective forecasting and compilation of performance. An exemplary embodiment of the present invention enables the service provider to leverage that information, along with the usually complex pricing and service-level agreements, to perform risk assessment and sign better contracts.

An exemplary embodiment of the present invention provides a system and a method for determining the risk exposure of potential contract terms and provides decision support for improving the contract terms with a goal to profit improvement for the service provider.

An exemplary embodiment of the present invention provides a framework and an apparatus through which contract terms can be analyzed from the point of view of risk exposure for business transformation outsourcing contracts.

An exemplary embodiment of the present invention is a system that has a list of parameters, which may be included in the terms of a contract, a forecast of likely values of the parameters during the length of the contract or a desired subset of that period, or data history on those parameters which allow a statistical forecast to be generated, and cost and price structures of the parties involved in the contract, such as, clients, service providers, and vendors.

An exemplary embodiment of the present invention provides a software program that takes as input the above-mentioned elements and returns a measure of the level of risk exposure of the contract terms and/or an assessment of the improvement in potential profit that may occur if the terms were changed by a small amount, along with the amounts to which they should be changed.

The information shared between a client and a service provider may include, but is not limited to, information on billing periods, prices, penalties, bonuses, constraints, and service quality metrics of interest to the client.

The information shared between a service provider and a vendor may include, but is not limited to, information regarding the price structures (cost per minute, volume discounts, occupancy-rate-dependent prices, etc), the availability of staff, staff productivity levels, the rates for hiring, firing and overtime, minimum or maximum occupancy (i.e., utilization) levels, maximum variability in occupancy levels from month to month, the skills of the existing staff in terms of the types of calls that the vendor can handle, and the historical quality of service that the staff have provided, on average, for various service quality metrics of interest.

Information on an expected incoming load may also be input into an exemplary embodiment of the invention. This expected load may be a forecast of the number of calls or contacts, by type, that is likely to arrive over certain intervals (e.g., the billing period) within the planning horizon.

An exemplary embodiment of the present invention may use a model to represent the various parameters and constraints involved in a contact center contracting problem for the analysis of contract terms as previously described. An objective function for the model may vary, depending on the objective of the user of the invention.

Examples of objectives may include, for example, maximizing revenue to a service provider, minimizing cost to a client, maximizing revenue to a vendor, minimizing variability in staff utilization levels (or occupancy levels) at the vendor sites over the planning horizon, and the like. The value of such an objective function may depend primarily on the allocation of the forecasted load across vendor sites. The model may be used to optimize a given objective function using mixed-integer optimization. In particular, solving the model may generate the allocation of the forecasted load across vendor sites that will optimize the given objective function. In addition, the solution generated by the model may suggest how to manage the vendor's workforce with respect to hiring, firing, training, and overtime, by vendor, vendor site and skill type.

The following description presents a hypothetical contract negotiation situation where there is one client, one service provider and multiple contact center vendors. This formulation is a specific example of how an exemplary method in accordance with the present invention may be implemented.

The client may forecast the volume (for example, in minutes) of calls it expects to receive over a planning horizon (for example, the next 12 months). Call volume forecasts may be classified by "line of business" (LOB). In this example, the line of business is representative of the skills, or training, of a call center staff. In general, a line of business may be defined as either a specific skill or a specific collection or combination of skills. The client is seeking to contract the outsourcing of the management of its calls to the service provider. The service provider does not directly handle the client's calls. Instead, the service provider directs the client's calls to multiple contact center vendors. Each vendor may in turn manage centers located at multiple sites, and each vendor site may only be capable of handling calls belonging to a subset of all lines of business. Vendors also may have a limited capacity to handle calls at each site. Therefore, the service provider decides how to allocate or assign the client's forecasted call volume (on a month-to-month basis) to each vendor, subject to the aforementioned constraints on the vendors.

According to a proposed contract, the client may propose to pay the service provider according to the volume of calls that is managed by the service provider. In particular, the client may propose to pay a fixed rate per minute of calls managed. This rate may vary according to the vendor site that ultimately handles the call.

The client may also propose that there should also be service level agreements that the service provider has with the client. In particular, the client and service provider may propose targeted performance terms using, for example, the following measures: Average Handling Time (AHT), First Call Resolution (FCR) and Customer Satisfaction (CSAT). For AHT and FCR, the client may propose to pay a bonus to the service provider when the service provider outperforms the targeted levels. The bonus that is proposed may be proportional to the degree to which the service provider outperforms the targeted levels. For all three metrics, when the targeted performance is not achieved, the proposed contract term may propose that the service provider pay a penalty to the client. For AHT and FCR, the proposed penalty may be proportional to the degree to which the target is missed. For CSAT, however, the proposed penalty paid may be proportional to the total revenue earned by service provider from the client (excluding bonuses).

The service provider may pay each vendor according to the volume of calls that the vendor handles. The payment to each vendor may depend not only on the total minutes of each line of business handled by the vendor, but also on the utilization, or occupancy level, of the vendor. The occupancy level at a call center (or vendor) may be defined as the ratio of the total volume of calls allocated to the call center (or vendor) and the total call volume capacity of the call center (or vendor).

The payments that the service provider pays to a vendor may possess, for example, one of two structures, depending on the type of vendor. The first type of vendor, referred to as a 'regular' vendor, may employ an all-units discounting scheme. Under this scheme, the rate that the vendor charges the service provider decreases with increasing call volume and occupancy level. That is, the vendor defines a rate for every combination of call volume and occupancy level. This rate may be constant within a certain range of values of call volume and occupancy level, and may decrease only after the call volume and occupancy levels exceed certain pre-determined threshold levels. There may be several such threshold levels. The discounted rate may be applied to all calls at a given 'regular' vendor site. In general, different vendors may charge the service provider different rates.

The second type of vendor, may be referred to as a 'through' vendor. A through vendor may employ an incremental discounting scheme. Under this scheme, the rate that the vendor charges the service provider also decreases with increasing call volume and occupancy level at a given vendor site. However, a given discounted rate applies only to the portion of the call volume that lies in the range between the thresholds corresponding to the discounted rate. When determining the payment to a 'through' vendor, call volumes may be aggregated across all sites belonging to the vendor.

Depending on who (i.e., the client, the service provider or a vendor) is utilizing the invention, the objective of the underlying optimization method may vary. Assuming that the invention is used by a service provider, then a reasonable objective may be to determine which of several alternative contract terms maximize the service provider's profit.

Figure 2:
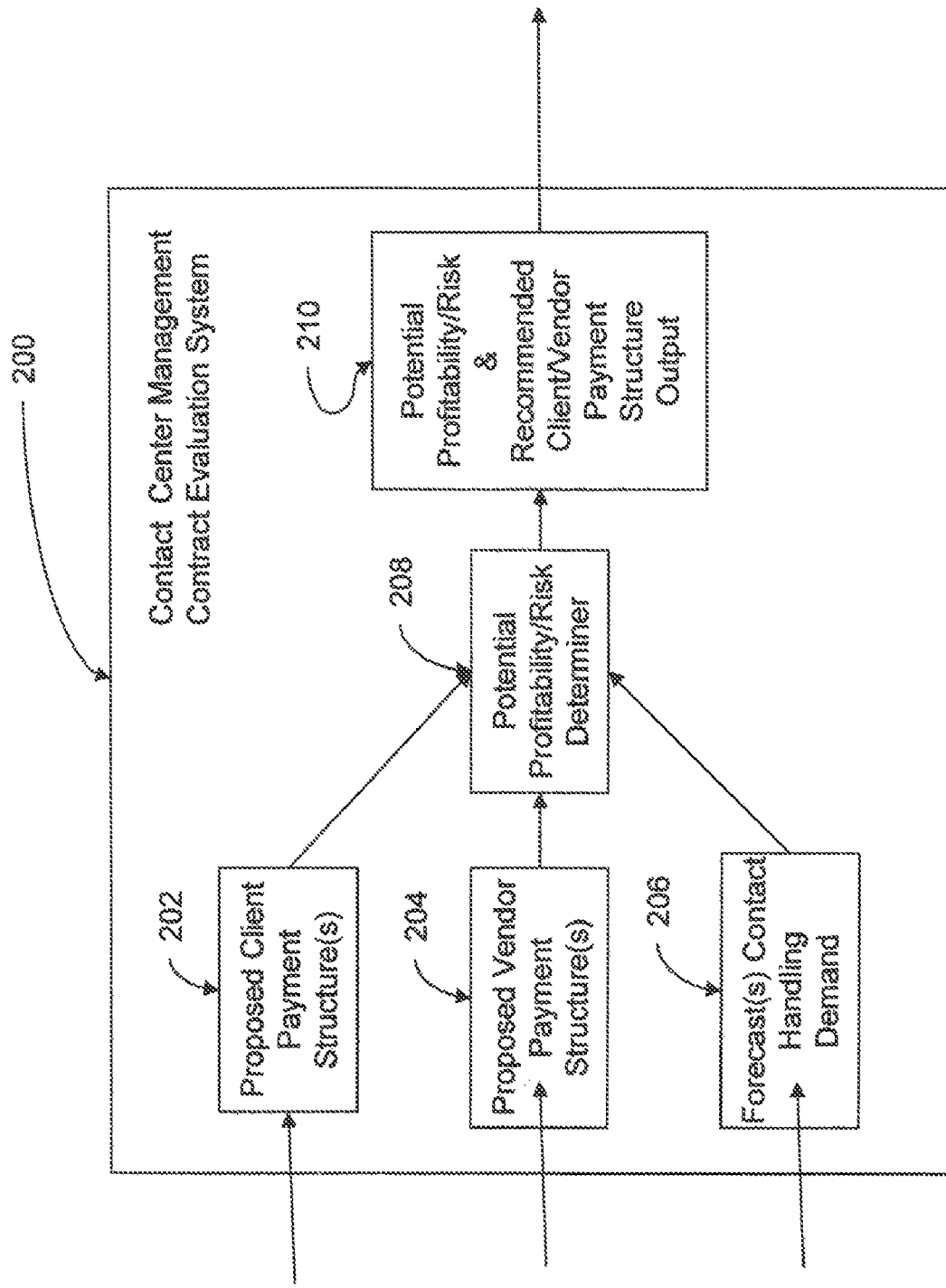
FIG. 2 illustrates an exemplary contact center management contract evaluation system 200 in accordance with the present invention.

FIG. 2 illustrates one exemplary contact management contract evaluation system 200 in accordance with the present invention. The contact management contract evaluation system 200 receives a proposed client payment structure 202 based upon a proposed set of contract terms between the service provider 104 and the client 102. The contact management contract evaluation system 200 also receives a proposed vendor payment structure 204 based upon a proposed set of contract terms between the service provider 104 and the vendor(s) 106. While this exemplary embodiment of the present invention receives terms which are proposed for contracts between the service provider and both the client and vendors, those of ordinary skill in the art understand that any one of these proposed contracts may be an existing contract.

The contact management contract evaluation system 200 also receives a forecast contact handling demand 206 from the client 102. The forecast contact handling demand 206 may include forecast data regarding the type and volume of contacts that require handling. The contact management contract evaluation system 200 may also include a potential profitability/risk determiner 208 that determines the potential profitability/risk for the proposed contract terms. The potential profitability/risk determiner 208 determines the potential profitability/risk based upon, at least, the proposed client payment structure, the proposed vendor payment structure, and the forecast contact handling demand. The contact management contract evaluation system 200 further includes a potential profitability/risk output device 210 that outputs data representing the potential profitability/risk that is determined by the potential profitability/risk determiner 208.

Figure 3:
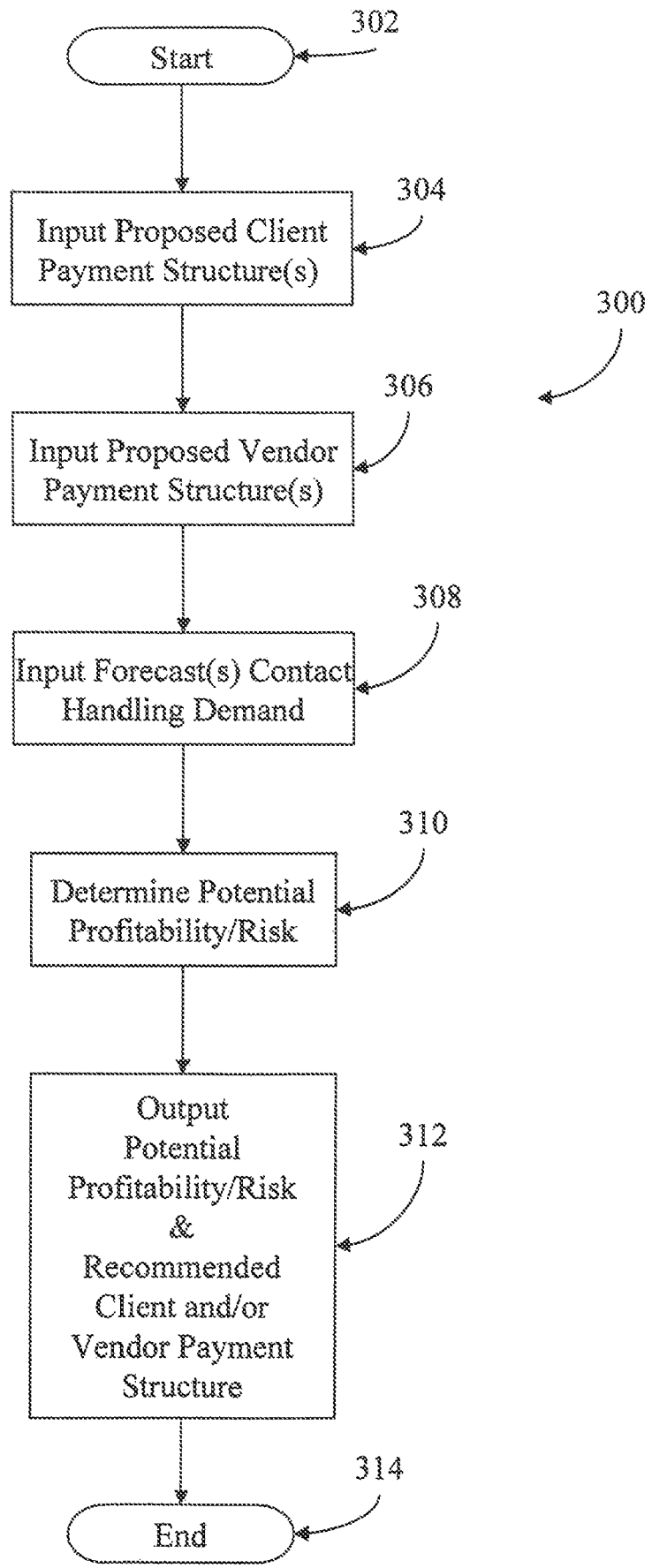
FIG. 3 is a flowchart 300 of an exemplary contact management contract evaluation method in accordance with the present invention.
Figure 4:
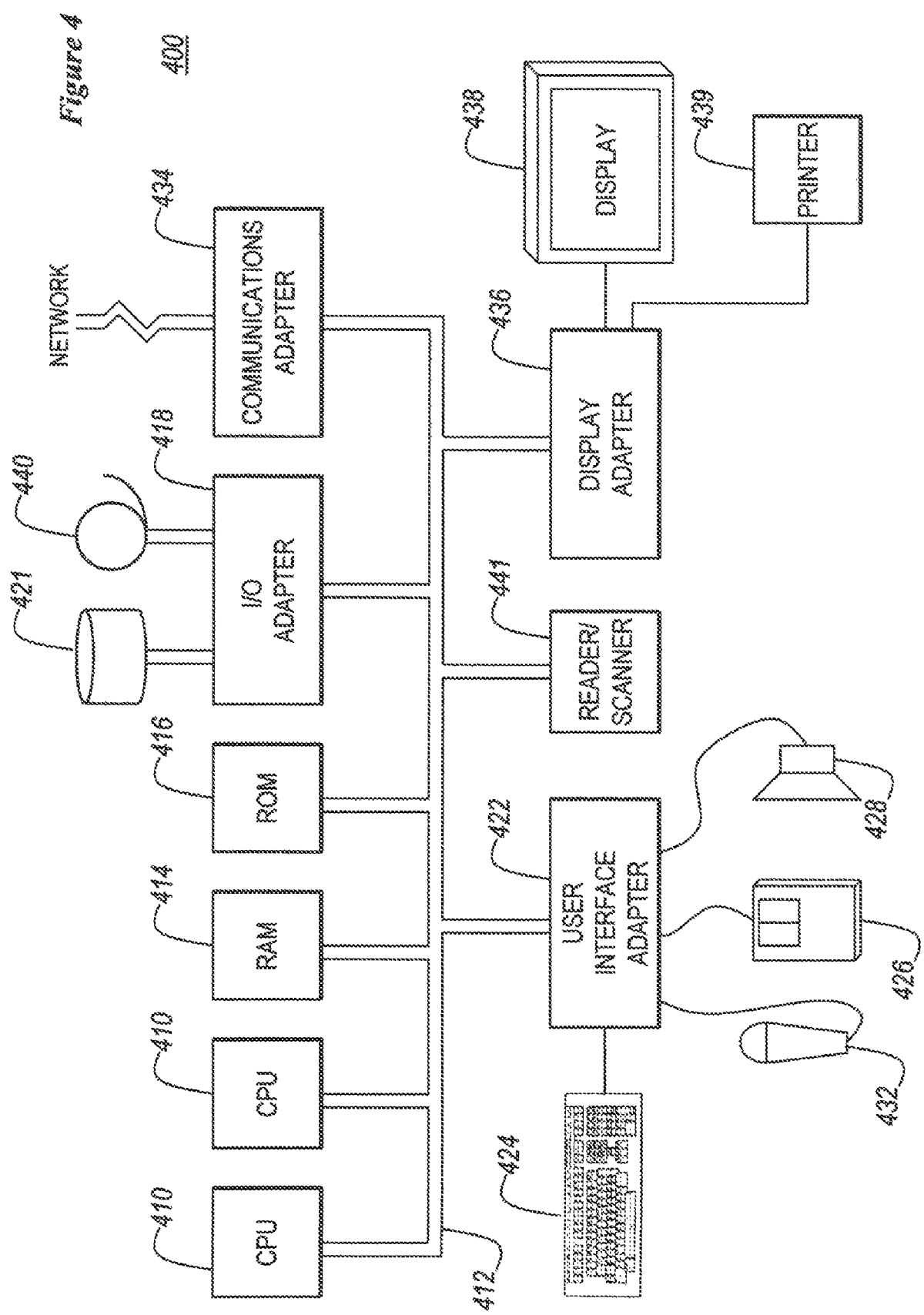
FIG. 4 illustrates a typical hardware configuration 400 which may be used for implementing the inventive system and method for contact center management contract evaluation.
Figure 5:
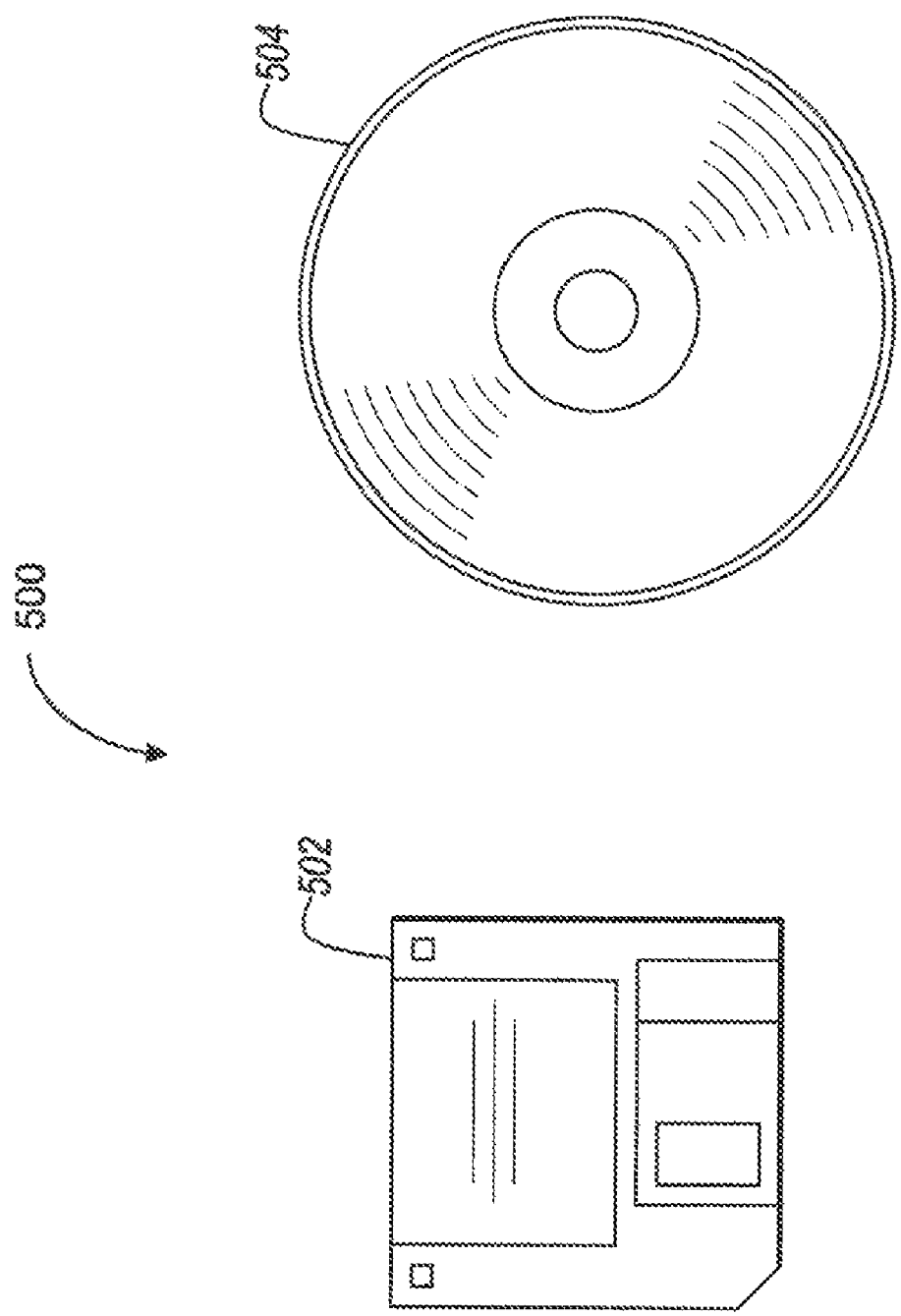
FIG. 5 illustrates exemplary signal bearing media for storing a program embodying an exemplary method for contact center management contract evaluation in accordance with the present invention.

FIG. 3 is a flowchart 300 of one exemplary method in accordance with the present invention. The flowchart starts at step 302 and continues to step 304, where the contact management system 200 inputs a proposed client payment schedule based upon the proposed contract terms between the client 102 and the service provider 104. Next, the method inputs a proposed vendor(s) payment structure in step 306 based upon proposed contact(s) terms between the service provider 104 and the vendor(s) 106. The method continues to step 308 where the method inputs a forecast or forecasts of contact handling demand from the client 102 and continues to step 310.

In step 310, the method determines a potential profitability/risk based upon the input proposed client payment structure(s), the input proposed vendor payment structure(s), and the input forecast(s) of contact handling demand by simulating a contact center environment operating under the proposed terms, and the like, and continues to step 312. In step 312, the method outputs to the user the potential profitability/risk and a recommendation for the client and/or vendor payment structure and parameters which will optimize the potential profitability/risk and then ends in step 314.

To formulate the hypothetical situation previously described, the following notation is defined:

Sets and Parameters $P$ is set to all LOBs $V_R$ is set of regular Vendors $V_T$ is set of through Vendors $S$ is the set of all Sites $S_v \subset S$ is the subset of sites that belong to vendor $v \in V_R \cup V_T$ $v_s$ is the vendor of site $s \in S$ T=Number of months in planning horizon $N_v$=Number of call volumne threshold ranges for vendor $v \in V_R \cup V_T$ $O_v$=Number of occupancy threshold ranges for vendor $v \in V_R \cup V_T$ $c_{spt}$=Capacity (in minutes) at site s for LOB p in month t, wheres $s \in S, p \in P, t=1, 2, \ldots, T$ $d_{pt}$=Call Volumne Forecast (in minutes) for LOB p in month t, where $p \in P, t=1, 2, \ldots T$ Client Service Level Related Contract Parameters $\overline{AHT}_t$=Targeted AHT in month $t=1, 2, \ldots T$ $\overline{FCR}_t$=Targeted FCR in month $t=1, 2, \ldots T$ $\overline{CSAT}_t$=Targeted CSAT in month $t=1, 2, \ldots T$ $AHT_s$=Historical average handling time (sec. per call) at site $s \in S$ $FCR_s$=Historical average fraction of calls handled within first response at site $s \in S$ $CSAT_s$=Historical average customer satisfaction rating at site $s \in S$ Objective Function Parameters $r_s$=Revenue earned from client per minute allocated to site $s \in S$ $f_{vno}$=Payment rate to vendor $v \in V_R \cup V_T$ per minute allocated at call volume threshold range $n=1, \ldots, N_v$ and occupancy threshold range $o=1, \ldots, O_v$ $b_{vno}$=Cumulative payment to vendor $v \in V_T$ up to call volume threshold range $n=1, \ldots, N_v$ for occupancy threshold range $o=1, \ldots, O_v$ $c_+^{AHT}$=Per minute bonus for undershooting AHT target $c_-^{AHT}$=Per minute penalty for overshooting AHT targe, $c_+^{AHT} < c_-^{AHT}$ $c_+^{FCR}$=Per minute bonsu for overshooting FCR target $c_-^{FCR}$=Per minute penalty for undershooting FCR target, $c_+^{FCR} < c_-^{FCR}$ $c_-^{CSAT}$=Per minute penalty for undershooting CSAT target Vendor Cost Related Parameters $f_{vno}$=Rate (in dollars per minute) charged by vendor v for a call in volume threshold range n and occupancy threshold range o, where $n=1, 2, \ldots, N_v$ and $o=1, 2, \ldots, O_v$ $b_{vno}$=Amount that would be charged by vendor v if the vendor's total call volume exactly fills threshold range n and occupancy threshold range o, where $n=1, 2, \ldots, N_v$ and $o=1, 2, \ldots O_v$ $LB_{vn}^{vol}$=Lower limit on call volume in threshold range $n=1, 2, \ldots, N_v$ for vendor $v \in V_R \cup V_T$ $UB_{vn}^{vol}$=Upper limit on call volume in threshold range $n=1, 2, \ldots, N_v$ for vendor $v \in V_R \cup V_T$ $LB_{vo}^{occ}$=Lower limit on occupancy level in theshold range $o=1, 2, \ldots, O_v$ for vendor $v \in V_R \cup V_T$ $UB_{vo}^{occ}$=Upper limit on occupancy level in threshold range $o=1, 2, \ldots, O_v$ for vendor $v \in V_R \cup V_T$ The decisions that will influence the service provider's profit may be captured both directly and indirectly by the following variables:

Decision Variables:

$x_{snopt}$ = Minutes of LOB p allocated to site s in month t at vendor cost rate $f_{v_sno}$ where $p \in P, s \in S, t = 1, \ldots, T$ $y_{snot} = \begin{cases} 1, & \text{if site } s \text{ experiences call volume in threshold range } n \\ & \text{and occupancy in threshold range } o \text{ in month } t, \\ 0, & \text{otherwise,} \end{cases}$ for all $s: v_s \in V_R, n = 1, 2, \ldots, N_v, o = 1, 2, \ldots, O_v, t = 1, \ldots, T$ $\hat{y}_{vnot} = \begin{cases} 1, & \text{if vendor } v \text{ experiences call volume in threshold} \\ & \text{range } n \text{ and occupancy in threshold range } o \text{ in month } t \\ 0, & \text{otherwise,} \end{cases}$ for all $v \in V_T, n = 1, 2, \ldots, N_v, o = 1, 2, \ldots, O_v, t = 1, \ldots, T$ $q_{+,t}^{AHT}(q_{-,t}^{AHT}) = $ Positive (negative) deviation of actual AHT from targeted AHT, $t = 1, \ldots, T$ $q_{+,t}^{FCR}(q_{-,t}^{FCR}) = $ Positive (negative) deviation of actual FCR from targeted FCR, $t = 1, \ldots, T$ $q_{+,t}^{CSAT}(q_{-,t}^{CSAT}) = $ Positive (negative) deviation of actual CSAT from targeted CSAT, $t = 1, \ldots, T$ $w_t = \begin{cases} 1, & \text{if CSAT target is met in month } t \\ 0, & \text{otherwise.} \end{cases}$ for all $t = 1, \ldots, T$ $z_t = \begin{cases} \sum_{snopt} r_s x_{snopt}, & \text{if CSAT target is not met in month } t, \\ & \text{where } t = 1, \ldots, T \\ 0, & \text{otherwise.} \end{cases}$ for all $t = 1, \ldots, T$ $\lambda_{vnot} = \begin{cases} \text{Fration of interval } [LB_{vn}^{vol}, UB_{vn}^{vol}] \text{ covered by allocation} \\ \text{of calls to vendor in month } t, & \text{if } \hat{y}_{vnot} = 1 \\ 0, & \text{otherwise} \end{cases}$ for all $v \in V_T, n = 1, 2, \ldots, N_v, o = 1, 2, \ldots, O_v, t = 1, \ldots, T$ The primary decision variables are captured in $x_{snopt}$, the allocation of calls from various lines of business to various vendors in each month. All other decision variables are auxiliary variables which are influenced by the value of $x_{snopt}$.

The optimization model may be a formulation as a mixed-integer program as follows:

Objective Function $$\max. \; Z = \sum_{snopt} r_s x_{snopt} \quad (1)$$

$$- \sum_{snopt: v_n \in V_R} f_{v_n no} x_{snopt} \quad (2)$$

$$- \sum_{vnot: v \in V_T} [\hat{y}_{vnot} b_{vno} + \lambda_{vnot}(UB_{vn}^{vol} - LB_{vn}^{vol}) f_{vno}] \quad (3)$$

$$- \sum_{pt} d_{pt}(c_+^{FCR} q_+^{FCR} - c_-^{FCR} q_-^{FCR}) \quad (4)$$

-continued $$-\sum_{pt} d_{pt}/A\overline{H}T_t(c_+^{AHT}q_-^{AHT} - c_-^{AHT}q_+^{AHT}) \quad (5)$$

$$-\sum_t c_-^{CSAT}z_t \quad (6)$$

The service provider's objective may be expressed by the equation comprised of the terms (1)-(6). In the objective function, term (1) captures the revenue earned from the total volume of the client's calls that are managed by the service provider. Term (2) captures the payments that the service provider makes to regular vendors. Term (3) captures the payments that the service provider makes to 'through' vendors. Term (4) captures the bonus (or penalty) earned (or paid) by the service provider for its performance with respect to the FCR target. Term (5) captures the bonus (or penalty) earned (or paid) by the service provider for its performance with respect to the AHT target. Term (6) captures the penalty paid by the service provider to the client if it fails to meet the CSAT target.

Forecast Satisfaction Constraint $$\sum_{sno} x_{snopt} = d_{pt} \quad \forall \, p \in P, t = 1, \ldots, T \quad (7)$$

Equation (7) ensures that the forecasted call volume is satisfied by the service provider's allocation. In the case where vendor capacity is insufficient to handle the total forecasted call volume, a 'dummy' vendor with sufficiently large capacity and sufficiently high cost can be used to 'handle' all overflow calls. Any calls 'handled' by the dummy vendor in the solution to the model are unsatisfied in reality.

Vendor Capacity Constraint $$\sum_{nop} x_{snopt} \le \sum_p c_{spt} \quad \forall \, s \in S, t = 1, \ldots, T \quad (8)$$

Inequality (8) ensures that the service provider's allocation of calls to the vendors does not exceed the vendors' capacity to handle the allocated lines of business. When a vendor site does not have any staff that possesses the skills to handle a particular line of business, then the site's capacity for that line of business is considered to be zero.

Inequality (8) may also be modified to accommodate hiring and firing decisions. For example, the summand in the right hand side of inequality (8) may be modified to include two additional terms: $h_{spt}$ and $g_{spt}$, where $h_{spt}$ is added to the existing capacity and represents the number of people hired at site s for line of business p in period t and $g_{spt}$ is subtracted from the existing capacity and represents the number of people fired at site s for line of business p in period t. Additionally, the capacity term should reflect the capacity (i.e., number of employees) available at the end of the previous period. For example, the right hand side of inequality (8) could read $$\sum_p (c_{spt-1} + h_{spt} - g_{spt}).$$

Additional constraints may be required to ensure that the number of employees is 'conserved' from period to period. In this case, it means that the number of employees available at the end of a period t is equal to the number of employees available at the end of period t−1, plus any employees that were hired and minus any employees that were fired.

In order to account for the costs associated with employing, hiring and firing of staff, the objective function, given by (1) through (6) could be modified to include additional linear terms that capture these costs. Additional constraints may be used to bound the number of people hired or fired at each site for each line of business in each period. In particular, the number of people fired should be limited by the number of employees.

In a similar manner, the model may be modified to accommodate a training decision by introducing yet another set of variables that capture the decision to train employees who are currently able to perform in one line of business to perform in another line of business. Additional constraints may be required to ensure that there is a 'conservation' of employees from period to period. That is, all employees cannot simply 'disappear' or 'appear' unless they are accounted for through the training decisions. These constraints may also account for training time, which may span multiple periods. The cost of training may be captured in the objective function by including additional linear terms.

Inequality (8) may also be modified to allow employees that are trained in one line of business to service a demand for multiple lines of business, or to allow demands for different lines of business to be serviced by employees trained in the same line of business. These modifications may be relevant in the situation where employees trained to handle higher level tasks can also perform lower level tasks, or when lines of business are defined as a combination of skill sets.

Occupancy-Based Vendor Rate 'Selection' Constraints $$\sum_p x_{snopt} \le y_{snot} UB_{v_s o}^{occ} \sum_p c_{spt} \quad \forall \, s \in S, \quad (9)$$
$$n = 1, \ldots, N_{v_s}, o = 1, \ldots, O_{v_s}, t = 1, \ldots, T$$

$$\sum_p x_{snopt} \ge y_{snot} LB_{v_s o}^{occ} \sum_p c_{spt} \quad \forall \, s \in S, \quad (10)$$
$$n = 1, \ldots, N_{v_s}, o = 1, \ldots, O_{v_s}, t = 1, \ldots, T$$

$$\sum_{ps:s \in S_v} x_{snopt} \le \hat{y}_{vnot} UB_{vo}^{occ} \sum_{ps:s \in S_v} c_{spt} \quad \forall \, v \in V_T, \quad (11)$$
$$n = 1, \ldots, N_v, o = 1, \ldots, O_v, t = 1, \ldots, T$$

$$\sum_{ps:s \in S_v} x_{snopt} \ge \hat{y}_{vnot} LB_{vo}^{occ} \sum_{ps:s \in S_v} c_{spt} \quad \forall \, v \in V_T, \quad (12)$$
$$n = 1, \ldots, N_v, o = 1, \ldots, O_v, t = 1, \ldots, T$$

Volume-Based Vendor Rate 'Selection' Constraints $$\sum_p x_{snopt} \le y_{snot} UB_{v_s n}^{vol} \quad \forall \, s \in S, n = 1, \quad (13)$$
$$\ldots, N_{v_s}, o = 1, \ldots, O_{v_s}, t = 1, \ldots, T$$

-continued $$\sum_p x_{snopt} \geq y_{snot} LB_{v_s n}^{vol} \quad \forall s \in S, n = 1, \quad (14)$$
$$\ldots, N_{v_s}, o = 1, \ldots, O_{v_s}, t = 1, \ldots, T$$

$$\sum_{ps: s \in S_v} x_{snopt} \leq \hat{y}_{vnot} UB_{vn}^{vol} \quad \forall v \in V_T, n = 1, \quad (15)$$
$$\ldots, N_v, o = 1, \ldots, O_{v_s}, t = 1, \ldots, T$$

$$\sum_{ps: s \in S_v} x_{snopt} \geq \hat{y}_{vnot} LB_{vn}^{vol} \quad \forall v \in V_T, n = 1, \quad (16)$$
$$\ldots, N_v, o = 1, \ldots, O_{v_s}, t = 1, \ldots, T$$

$$\sum_{ps: s \in S_v} x_{snopt} = \hat{y}_{vnot} LB_{vn}^{vol} + \lambda_{vnot}(UB_{vn}^{vol} - LB_{vn}^{vol}) \forall v \in V_T, \quad (17)$$
$$n = 1, \ldots, N_v, o = 1, \ldots, O_v, t = 1, \ldots, T$$

Inequalities (9), (10), (13) and (14) jointly determine the qualifying discount rate for the occupancy level and call volume handled at each site belonging to a regular vendor. Inequalities (11), (12), (15) and (16) jointly determine the qualifying discount rate for the occupancy level and call volume handled at each site belonging to a 'through' vendor. Equation (17) separates the call volume handled by a 'through' vendor in terms of the number of discount ranges that it fully traverses, and the fraction of the discount range that it only partially traverses.

Special Ordered Constraints $$\sum_{no} y_{snot} \leq 1 \quad \forall s: v_s \in V_R, t = 1, \ldots, T \quad (18)$$

$$\sum_{no} \hat{y}_{vnot} \leq 1 \quad \forall v \in V_T, t = 1, \ldots, T \quad (19)$$

Inequalities (18) and (19) ensure that, for each vendor, no more than one payment rate is applied in a given month.

Service Level Agreement Constraints $$\left(\sum_{snop} x_{snopt} AHT_s / \sum_p d_{pt}\right) - A\overline{H}T_t = \quad (20)$$
$$q_{+,t}^{AHT} - q_{-,t}^{AHT} \quad \forall t = 1, \ldots, T$$

$$\left(\sum_{snop} x_{snopt} FCR_s / \sum_p d_{pt}\right) - \overline{FCR}_t = \quad (21)$$
$$q_{+,t}^{FCR} - q_{-,t}^{FCR} \quad \forall t = 1, \ldots, T$$

$$\left(\sum_{snop} x_{snopt} CSAT_s / \sum_p d_{pt}\right) - \overline{CSA}T_t = \quad (22)$$
$$q_{+,t}^{CSAT} - q_{-,t}^{CSAT} \quad \forall t = 1, \ldots, T$$

Equations (20), (21) and (22) determine the extent to which the AHT, FCR and CSAT performance, respectively, outperforms or misses its target.

Linearizing Constraints $$q_{-,t}^{CSAT} \leq w_t^{CSAT} \quad \forall t = 1, \ldots, T \quad (23)$$

$$z_t \leq \overline{z}_t w_t^{CSAT} \quad \forall t = 1, \ldots, T \quad (24)$$

$$z_t \geq \sum_{snop} x_{snopt} r_s - \overline{z}_t (1 - w_t^{CSAT}) \quad \forall t = 1, \ldots, T \quad (25)$$

Inequalities (23), (24) and (25) are used to determine the penalty to be paid with respect to the CSAT service level metric. The penalty is greater than zero only if the CSAT target is missed. These linear inequalities are used to avoid expressions in the objective function which involve the multiplication of two or more decision variables with each other.

The solution to the optimization model will produce the values of $x_{snopt}$ that will result in the maximum profit for the service provider. If an alternative objective function is used (e.g., minimize client payments to service provider), then the values of $x_{snopt}$ produced by solving the modified optimization model will be the values that will optimize the new objective function.

As an example of how an exemplary embodiment of the present invention may be used to analyze the risk associated with specific contract terms, an optimization model may first be populated with a specific set of contract terms (e.g., service level related contract parameters and objective function parameters) and other necessary parameters and solved to obtain a prediction of the resulting profit for the service provider. Next, the optimization model can be populated with another set of contract terms, keeping all other parameters the same, wherein at least one of these terms is different from the terms used in the previously used set of contract terms, to obtain another prediction of the resulting profit for the service provider. This process may be repeated to examine a range of contract terms and the corresponding impact on expected profit. In this way, favorable combinations of contract terms (e.g., client and/or vendor cost structures and parameters) may be identified.

As an additional example of how the exemplary optimization model may be used to analyze the risk associated with a set of contract terms, the model may first be populated with a specific set of contract terms and specific call volume forecast and solved to obtain a prediction of the resulting profit for the service provider. Next, the optimization model may be populated with a different scenario of call volumes and with same contract terms as in the first step, and solved to obtain another prediction of the resulting profit for the service provider. This process may be repeated for one or more call volume scenarios to obtain an understanding of the risk exposure (e.g., with respect to profitability) of a given set of contract terms. In this way, the invention is able to measure the sensitivity of the profitability of given contract to the contact center demand forecast.

While the invention has been described in terms of several exemplary embodiments, those skilled in the art will recognize that the invention can be practiced with modification.

Further, it is noted that, Applicants' intent is to encompass equivalents of all claim elements, even if amended later during prosecution.

What is claimed is:

1. A method of contact center management contract evaluation, said method comprising:

determining, using a processor in a computer, a potential profitability/risk for contact center management based upon a proposed contract term between at least one of:

a client and a service provider; and a service provider and a vendor, wherein said profitability/risk comprises a profitability risk associated with such contract terms as payment structures and not meeting profitability targets of contracts for said contact center management, wherein said determining of said potential profitability/risk comprises modeling a contact center environment and satisfying an objective function for said model, wherein said objective function comprises one of maximizing revenue to a service provider, minimizing cost to a client, maximizing revenue to a vendor, and minimizing variability in staff utilization, using a mixed-integer optimization of said objective function, and wherein said objective function comprises a service provider's objective function having a format as follows for said mixed-integer optimization and selectively subject to one or more of the identified constraints:

Model Formulation:

Objective Function $$\max. \ Z = \sum_{snopt} r_s x_{snopt} \quad (1)$$

$$- \sum_{snopt: v_n \in V_R} f_{v_n no} x_{snopt} \quad (2)$$

$$- \sum_{vnot: v \in V_T} [\hat{y}_{vnot} b_{vno} + \lambda_{vnot}(UB_{vn}^{vol} - LB_{vn}^{vol}) f_{vno}] \quad (3)$$

$$- \sum_{pt} d_{pt}(c_+^{FCR} q_+^{FCR} - c_-^{FCR} q_-^{FCR}) \quad (4)$$

$$- \sum_{pt} d_{pt} / A\overline{H}T_t (c_+^{AHT} q_-^{AHT} - c_-^{AHT} q_+^{AHT}) \quad (5)$$

$$- \sum_{t} c_-^{CSAT} z_t \quad (6)$$

Forecast Satisfaction Constraint $$\sum_{sno} x_{snopt} = d_{pt} \quad \forall p \in P, t = 1, \ldots, T \quad (7)$$

Vendor Capacity Constraint $$\sum_{nop} x_{snopt} \le \sum_{p} c_{spt} \quad \forall s \in S, t = 1, \ldots, T \quad (8)$$

Occupancy-Based Vendor Rate 'Selection' Constraints $$\sum_{p} x_{snopt} \le y_{snot} UB_{v_s o}^{occ} \sum_{p} c_{spt} \quad \forall s \in S, \quad (9)$$

$$n = 1, \ldots, N_{v_s}, o = 1, \ldots, O_{v_s}, t = 1, \ldots, T$$

$$\sum_{p} x_{snopt} \ge y_{snot} LB_{v_s o}^{occ} \sum_{p} c_{spt} \quad \forall s \in S, \quad (10)$$

$$n = 1, \ldots, N_{v_s}, o = 1, \ldots, O_{v_s}, t = 1, \ldots, T$$

$$\sum_{ps:s \in S_v} x_{snopt} \le \hat{y}_{vnot} UB_{vo}^{occ} \sum_{ps:s \in S_v} c_{spt} \quad \forall v \in V_T, \quad (11)$$

$$n = 1, \ldots, N_v, o = 1, \ldots, O_v, t = 1, \ldots, T$$

$$\sum_{ps:s \in S_v} x_{snopt} \ge \hat{y}_{vnot} LB_{vo}^{occ} \sum_{ps:s \in S_v} c_{spt} \quad \forall v \in V_T, \quad (12)$$

$$n = 1, \ldots, N_v, o = 1, \ldots, O_v, t = 1, \ldots, T$$

Volume-Based Vendor Rate 'Selection' Constraints $$\sum_{p} x_{snopt} \le y_{snot} UB_{v_s n}^{vol} \quad \forall s \in S, n = 1, \quad (13)$$

$$\ldots, N_{v_s}, o = 1, \ldots, O_{v_s}, t = 1, \ldots, T$$

$$\sum_{p} x_{snopt} \ge y_{snot} LB_{v_s n}^{vol} \quad \forall s \in S, n = 1, \quad (14)$$

$$\ldots, N_{v_s}, o = 1, \ldots, O_{v_s}, t = 1, \ldots, T$$

$$\sum_{ps:s \in S_v} x_{snopt} \le \hat{y}_{vnot} UB_{vn}^{vol} \quad \forall v \in V_T, n = 1, \quad (15)$$

$$\ldots, N_v, o = 1, \ldots, O_{v_s}, t = 1, \ldots, T$$

$$\sum_{ps:s \in S_v} x_{snopt} \ge \hat{y}_{vnot} LB_{vn}^{vol} \quad \forall v \in V_T, n = 1, \quad (16)$$

$$\ldots, N_v, o = 1, \ldots, O_{v_s}, t = 1, \ldots, T$$

$$\sum_{ps:s \in S_v} x_{snopt} = \hat{y}_{vnot} LB_{vn}^{vol} + \lambda_{vnot}(UB_{vn}^{vol} - LB_{vn}^{vol}) \forall v \in V_T, \quad (17)$$

$$n = 1, \ldots, N_v, o = 1, \ldots, O_v, t = 1, \ldots, T$$

Special Ordered Constraints $$\sum_{no} y_{snot} \le 1 \quad \forall s : v_s \in V_R, t = 1, \ldots, T \quad (18)$$

$$\sum_{no} \hat{y}_{vnot} \le 1 \quad \forall v \in V_T, t = 1, \ldots, T \quad (19)$$

Service Level Agreement Constraints $$\left( \sum_{snop} x_{snopt} AHT_s \bigg/ \sum_{p} d_{pt} \right) - A\overline{H}T_t = \quad (20)$$

$$q_{+,t}^{AHT} - q_{-,t}^{AHT} \quad \forall t = 1, \ldots, T$$

$$\left( \sum_{snop} x_{snopt} FCR_s \bigg/ \sum_{p} d_{pt} \right) - F\overline{C}R_t = \quad (21)$$

$$q_{+,t}^{FCR} - q_{-,t}^{FCR} \quad \forall t = 1, \ldots, T$$

-continued $$\left(\sum_{snop} x_{snopt} CSAT_s \bigg/ \sum_p d_{pt}\right) - \overline{CSAT}_t = q_{+,t}^{CSAT} - q_{-,t}^{CSAT} \quad \forall\, t = 1, \ldots, T \tag{22}$$

Linearizing Constraints $$q_{-,t}^{CSAT} \le w_t^{CSAT} \quad \forall\, t = 1, \ldots, T \tag{23}$$

$$z_t \le \bar{z}_t w_t^{CSAT} \quad \forall\, t = 1, \ldots, T \tag{24}$$

$$z_t \ge \sum_{snop} x_{snopt} r_s - \bar{z}_t (1 - w_t^{CSAT}) \quad \forall\, t = 1, \ldots, T \tag{25}$$

where $\bar{z}_t$ is given, and is an upper bound on $z_t^*$.

Decision Variables:

$x_{snopt}$ = Minutes of LOB $p$ allocated to site $s$ in month $t$ at vendor cost rate $f_{v_s n o}$ where $p \in P$, $s \in S$, $t = 1, \ldots, T$ $$y_{snot} = \begin{cases} 1, & \text{if site } s \text{ experiences call volume in threshold range } n \\ & \text{and occupancy in threshold range } o \text{ in month } t, \\ 0, & \text{otherwise,} \end{cases}$$

for all $s : v_s \in V_R$, $n = 1, 2, \ldots, N_v$, $o = 1, 2, \ldots, O_v$, $t = 1, \ldots, T$ $$\hat{y}_{vnot} = \begin{cases} 1, & \text{if vendor } v \text{ experiences call volume in threshold} \\ & \text{range } n \text{ and occupancy in threshold range } o \text{ in month } t \\ 0, & \text{otherwise,} \end{cases}$$

for all $v \in V_T$, $n = 1, 2, \ldots, N_v$, $o = 1, 2, \ldots, O_v$, $t = 1, \ldots, T$ $q_{+,t}^{AHT}(q_{-,t}^{AHT}) = $ Positive (negative) deviation of actual AHT from targeted AHT, $t = 1, \ldots, T$ $q_{+,t}^{FCR}(q_{-,t}^{FCR}) = $ Positive (negative) deviation of actual FCR from targeted FCR, $t = 1, \ldots, T$ $q_{+,t}^{CSAT}(q_{-,t}^{CSAT}) = $ Positive (negative) deviation of actual CSAT from targeted CSAT, $t = 1, \ldots, T$ $$w_t = \begin{cases} 1, & \text{if CSAT target is met in month } t \\ 0, & \text{otherwise.} \end{cases}$$

for all $t = 1, \ldots, T$ $$z_t = \begin{cases} \sum_{snopt} r_s x_{snopt}, & \text{if CSAT target is not met in month } t, \\ & \text{where } t = 1, \ldots, T \\ 0, & \text{otherwise.} \end{cases}$$

for all $t = 1, \ldots, T$ $$\lambda_{vnot} = \begin{cases} \text{Fration of interval } [LB_{vn}^{vol}, UB_{vn}^{vol}] \text{ covered by allocation} & \text{if } \hat{y}_{vnot} = 1 \\ \text{of calls to vendor in month } t, & \\ 0, & \text{otherwise} \end{cases}$$

for all $v \in V_T$, $n = 1, 2, \ldots, N_v$, $o = 1, 2, \ldots, O_v$, $t = 1, \ldots, T$ Sets and Parameters:
P is the set of all LOBs
$V_R$ is the set of regular Vendors
$V_T$ is the set of through Vendors
S is the set of all Sites
$S_v \subset S$ is the subset of sites that belong to vendor $v \in V_R \cup V_T$
$v_s$ is the vendor of site $s \in S$
T=Number of months in planning horizon
$N_v$=Number of call volume threshold ranges for vendor $v \in V_R \cup V_T$
$O_v$=Number of occupancy threshold ranges for vendor $v \in V_R \cup V_T$
$c_{spt}$=Capacity (in minutes) at site s for LOB p in month t, where $s \in S$, $p \in P$, $t=1, 2, \ldots, T$
$d_{pt}$=Call Volume Forecast (in minutes) for LOB p in month t, where $p \in P$, $t=1, 2, \ldots, T$ Objective Function Parameters:
$r_s$=Revenue earned from client per minute allocated to site $s \in S$
$f_{vno}$=Payment rate to vendor $v \in V_R \cup V_T$ per minute allocated at call volume threshold range $n=1, \ldots, N_v$ and occupancy threshold range $o=1, \ldots, O_v$
$b_{vno}$=Cumulative payment to vendor $v \in V_T$ up to call volume threshold range $n=1, \ldots, N_v$ for occupancy threshold range $o=1, \ldots, O_v$
$c_+^{AHT}$=Per minute bonus for undershooting AHT target
$c_-^{AHT}$=Per minute penalty for overshooting AHT target, $c_+^{AHT} < c_-^{AHT}$
$c_+^{FCR}$=Per minute bonus for overshooting FCR target
$c_-^{FCR}$=Per minute penalty for undershooting FCR target, $c_+^{FCR} < c_-^{FCR}$
$c_-^{CSAT}$=Per minute penalty for undershooting CSAT target Vendor Cost Related Parameters:
$f_{vno}$=Rate (in dollars per minute) charged by vendor v for in call volume threshold range n and occupancy threshold range o,
where $n=1, 2, \ldots, N_v$ and $o=1, 2, \ldots, O_v$
$b_{vno}$=Amount that would be charged by vendor v if the vendor's total call volume exactly fills threshold range n and occupancy threshold range o,
where $n=1, 2, \ldots, N_v$ and $o=1, 2, \ldots, O_v$
$LB_{vn}^{vol}$=Lower limit on call volume in threshold range $n=1, 2, \ldots, N_v$ for vendor $v \in V_R \cup V_T$
$UB_{vn}^{vol}$=Upper limit on call volume in threshold range $n=1, 2, \ldots, N_v$ for vendor $v \in V_R \cup V_T$
$LB_{vo}^{occ}$=Lower limit on occupancy level in threshold range $o=1, 2, \ldots, O_v$ for vendor $v \in V_R \cup V_T$
$UB_{vo}^{occ}$=Upper limit on occupancy level in threshold range $o=1, 2, \ldots, O_v$ for vendor $v \in V_R \cup V_T$ Client Service Level Related Contract Parameters:
$AHT_s$=Historical average handling time (sec. per call) at site $s \in S$
$FCR_s$=Historical average fraction of calls handled within first response at site $s \in S$
$CSAT_s$=Historical average customer satisfaction rating at site $s \in S$
$\overline{AHT}_t$=Targeted AHT in month $t=1, 2, \ldots, T$
$\overline{FCR}_t$=Targeted FCR in month $t=1, 2, \ldots, T$
$\overline{CSAT}_t$=Targeted CSAT in month $t=1, 2, \ldots, T$.

* * * * *